United States Patent Office 3,142,533
Patented July 28, 1964

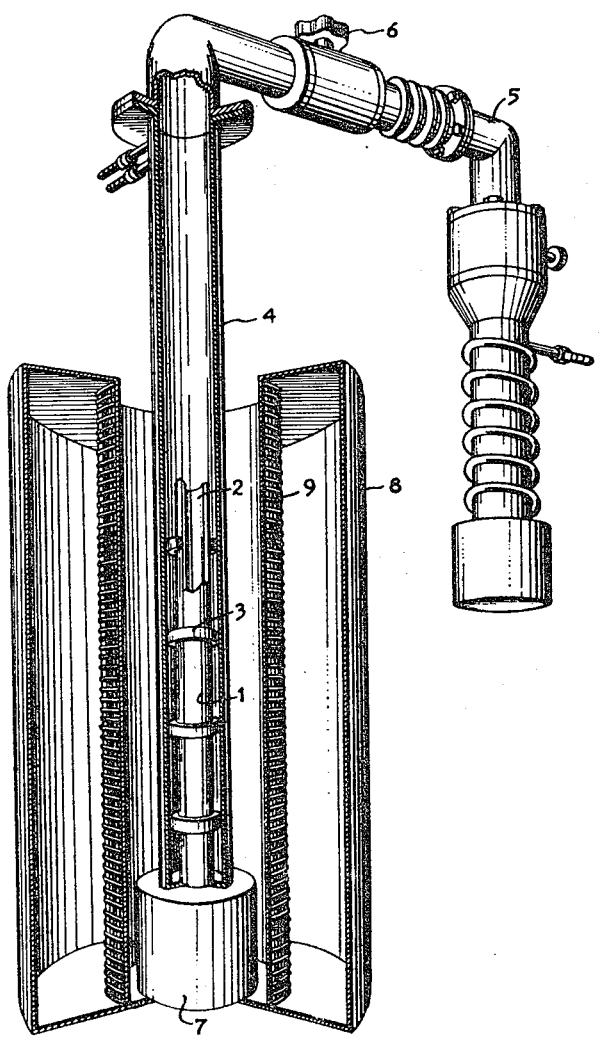

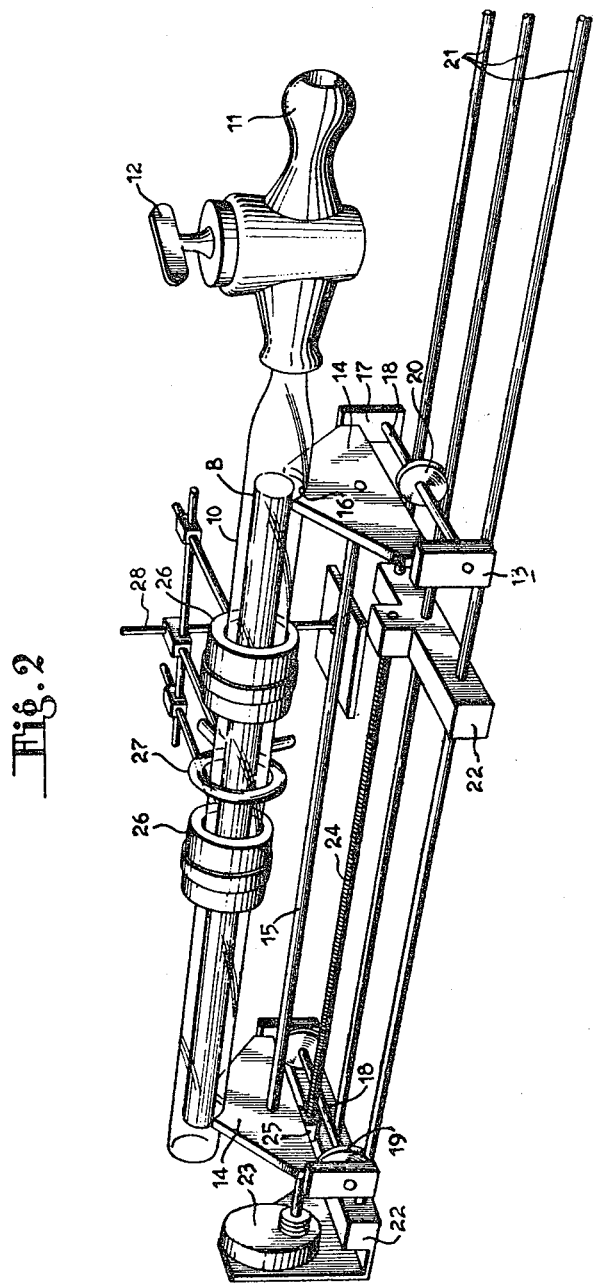

3,142,533
PROCESS FOR PREPARING SHAPED ARTICLES
OF URANIUM SILICIDES
André Accary and Jacques Dubuisson, Paris, and Jacques Humbert, Viroflay, France, assignors to Commissariat a l'Energie Atomique, Paris, France
Filed May 24, 1960, Ser. No. 31,294
Claims priority, application France May 29, 1959
12 Claims. (Cl. 23—14.5)

The present invention relates to uranium silicides.

Among these compounds, those which have been identified with certainty up to the present have the formulae: $U_3Si$, $U_3Si_2$, $USi$, $USi_2$ and $USi_3$.

The interest in obtaining shaped articles, such as bars, tablets, hollow cylinders and so on, constituted by means of these uranium silicides for purposes of study and application in the nuclear field, is clear.

Unfortunately, all these uranium silicides, with the exception of $U_3Si$, only have slight metallic characteristics; they are not materially ductile nor malleable and they are hard, extremely fragile and brittle.

The preparation of shaped articles is thus very difficult and is even impossible by usual metallurgical methods, particularly for industrial production.

The invention consists in avoiding these difficulties by means of an improved process permitting shaped articles to be made in a simple manner from a given uranium silicide and particularly from $U_3Si_2$, $USi$, $USi_2$ and $USi_3$.

This process is remarkable notably in that it consists in introducing into a mould an intimate mixture of particles of uranium and silicon in proportions corresponding to the uranium silicide which it is desired to obtain, heating this mixture in vacuo in the mould to a temperature at least equal to 450° C., but at which the mixture remains solid, and then setting the product obtained by heating in vacuo at a temperature greater than that of the first heating.

It has been discovered that uranium and silicon are capable of chemically reacting in the solid state from about 450° C. These reactions between uranium and silicon are exothermic and the reaction velocities depend upon the temperature.

The amounts of heat evolved (per 1 g. of reaction mixture at 550° C.) are as follows:

| | Calories |
|---|---|
| $U_3$—$Si_2$ | 5.4 |
| $U$ —$Si$ | 16.7 |
| $U$ —$Si_2$ | 37.0 |
| $U$ —$Si_3$ | 42.8 |

The first stage of heating of the process is governed by the following considerations; it is suitable to operate above 450° C., at temperatures at which the reaction velocity is sufficiently high without being uncontrollable. Temperatures between 625° and 675° C. give entirely satisfactory results for reaction times of at least about one hour.

At the end of the first stage, a coherent article is obtained, which can be removed from the mould and which is constituted by uranium silicides and uranium and silicon which have not reacted. This article is a conductor of electricity.

In order to complete the reaction and obtain a non-porous article of uranium silicide of the desired formula, it is necessary to effect a second, hardening heating at a higher temperature, between 1400° and 1500° C. for preference. This heating can be carried out in a furnace, the article either being still in or removed from the original mould. It is more suitable, however, to withdraw the article from the mould and to benefit for this second heating from the electrical conductivity of the article, by heating the latter either by the Joule effect i.e. by the heating due to the passage of an electric current therethrough or, preferably, by induction.

In order to carry out the heating by induction conveniently, it is particularly advantageous to heat the article in successive zones by relative displacement of the product and the induction element.

Other characteristics and advantages of the invention will appear from the following description.

Referring to the accompanying drawings, given solely by way of example:

FIG. 1 is a perspective view partly broken away of one embodiment of an apparatus for carrying out the first stage of the process;

FIG. 2 is a perspective view of one embodiment of an apparatus for carrying out the second stage of the process.

According to the embodiments illustrated in the drawings, the two forms of apparatus are designed for obtaining cylindrical bars B of uranium silicide having, as a specific example, dimensions of 40 cm. in length and 3.5 cm. in diameter.

The apparatus illustrated in FIG. 1 comprises a mould 1 of graphite in which is charged an intimate mixture of particles of silicon and uranium. This mould, which is open at its upper extremity, has a cylindrical internal surface and a doubly conical exterior surface, the section of this external surface decreasing from the central part of the mould towards each end; the mould is formed of several sections which are connected to one another along the generatrices. The conicity of the mould 1 is intended to facilitate removal of the bar. The sectors 2 of the mould are held in contact with one another by fixing collars 3, also of graphite, force-fitted around the external surface of the mould and maintained in position by reason of the conicity of this surface.

The mould 1 can be introduced into a cylindrical tube 4 of stainless steel to which is connected in a sealed manner a tube 5 and associated means for providing in the tube 4 a primary vacuum, followed by secondary degassing in vacuo.

A valve 6 provided in the tube 5 enables the tube 4 to be isolated. This tube is supported by a block 7 and can be located inside a tubular furnace 8. The furnace comprises a double wall in order to avoid loss of heat; heating elements 9 of the furnace are located on the external surface of the internal wall and are constituted for example by electric resistances.

The apparatus shown in FIG. 2 is intended for heating by induction the bar B obtained in the mould 1 after the first heating stage. This induction heating apparatus consists of a chamber 10, constituted by a silica tube for example, into which the bar B is introduced. The tube 10 can be connected by a union 11 provided with a valve 12 to a vacuum apparatus; it is supported horizontally by a carriage designated generally at 13.

This carriage comprises two vertical plates 14 joined by a tie-rod 15 and each provided at their upper part with a notch 16 in which the tube 10 rests. Each plate 14 is supported by blocks 17 in which an axle 18 rotates. The rearward axle 18 carries two wheels 19, while the forward axle 18 carries a single wheel 20. The wheels 19 and 20 are arranged to roll upon three horizontal rails 21, maintained at the appropriate spacing by two spacers 22. The rear spacer carries an electric motor with gear reducer 23 connected to one end of a threaded shaft 24, the other end of which is rotatably mounted in the forward spacer 22; the screw-threaded shaft 24 passes through a lug 25 carried by the rear plate 14 of the carriage 13.

Rotation of the shaft 24, alternatively in one direction and then in the other, by the motor-reducer assembly 23 causes alternate displacement of the lug 25 and consequently of the carriage 13 and thus also of the tube 10 supported by the carriage.

The apparatus is completed by heating means which comprise two tubular resistance furnaces 26 arranged one on either side of a tubular induction coil 27. The two tubular furnaces 26 and the coil 27 surround the tube 10 and are maintained in a fixed location by means of a support 28. The two tubular furnaces 26 are connected to a source of current, not shown, while the hollow coil 27, of brass cooled by means of an internal circulation of fluid, is located in a low impedance circuit to which a high frequency alternating current, 0.5 megacycle for example, is supplied from an appropriate electrical source, not shown. The coil 27 causes heating by highly concentrated induction restricted to one zone of the bar, while the tubular furnaces 26 have the purpose of avoiding too large a thermal gradient from one side to the other of this zone.

When the carriage 13 is displaced with the tube 10, the zone of heating is simultaneously displaced, such that the whole of the bar B can be heated satisfactorily.

As an example, a complete embodiment of the preparation of a bar such as B of $U_3Si_2$ is given below.

The starting materials used are, as indicated, uranium and silicon. The uranium is prepared by heating the oxide $UO_2$ with calcium and its characteristics are as follows:

| Nature of impurities | B | Cr | Cu | Fe | Mn | Ni | Si | |
|---|---|---|---|---|---|---|---|---|
| Parts per million (p.p.m.) | 0.1 | 18 | 20 | 60 | 8 | 15 | 100 | 100 |

UN: about 0.5 percent.
$UO_2$: 0.2–0.5 percent.
$UH_3$: 1–2 percent.

The average diameter of the uranium particles is $25\mu$.

The silicon has a purity of 99.9% and is prepared by the arc-reduction of silica, followed by purification. The main impurity is carbon (600 p.p.m.). The average size of the particles of silicon is $50\mu$.

The uranium and silicon powders are extensively mixed in a cubic mixer, i.e., a cubic box rotated about one of its diagonal axes, in proportions corresponding to the compound $U_3Si_2$. The mixture is then charged into the mould 1 and compacted in the mould by vibration.

This compacting of the mixture constitutes an important step, since it has been found that in order to obtain a final bar not subject to deformation or failure, the apparent density of the mixture of uranium and silicon must be determined according to the nature of the uranium silicide chosen. For $U_3Si_2$, the apparent density of the mixture after vibration should be about 5.8. For the silicides USi, $USi_2$ and $USi_3$, these densities should be about 5.6, 4.4 and 3.7 respectively. These figures are naturally only applicable to mixtures prepared with constituents having the characteristics enumerated above. It is readily possible to determine by successive tests in each case (that is to say by particle size and the mode of preparation of the silicon and uranium) what should be the apparent density which will give the best results (a coherent final product which does not undergo deformation or failure).

The mould 1 is then placed on the tube 4 in which a primary vacuum is created, followed by a secondary degassing in vacuo. When the residual pressure reaches $10^{-5}$ mm./Hg, the tube 4 is introduced into the tubular furnace 8. Adjustment of the heating effected by the furnace is important. In fact, at about 450° C., the temperature at which solid state reactions occur between uranium and silicon, the exothermicity of the reaction, if the heating is not controlled correctly, gives the risk of an initial explosion throwing the mixture of uranium and silicon out of the mould, which can be broken.

A rate of heating of 50° C. per hour is generally satisfactory for the range of temperatures from 400° to 650° C. After a stage of 1 hour at 650° C., the apparatus is slowly cooled. The bar B then has sufficient cohesion to be removed from the mould. The density of the bar is about 7.5, or 60% of the theoretical density.

The formation of $U_3Si_2$ from residual free uranium and silicon and the elimination of pores from the bar can be effected by maintaining the bar in vacuo at a sufficiently high temperature. Two hours at 1500° C. allow 90% of the theoretical density to be obtained.

This heating is best effected by means of the apparatus illustrated in FIG. 2, which makes use of the electrical conductivity of the bar B. By means of a high frequency generator, having a power output of 10 kilowatts and a speed of displacement of the carriage 13 of approximately 4 cm./hour, it is possible to obtain bars B of which the density is very close to the theoretical density.

The apparatus shown in FIG. 2 thus makes it possible to obtain bars of considerable length very readily.

Moreover, the problem of supporting the bar while avoiding pollution at high temperature is considerably simplified since the heated zone is very short and is displaced slowly.

Furthermore, during the hardening, the bar is little subject to alteration in shape and does not assume the wasted shape as is the case in known hardening methods.

The invention is not limited to the modes of operation described, which are merely given by way of example.

It will be understood that in the same manner as described in detail above, bars of uranium silicides other than $U_3Si_2$ can be readily obtained.

What we claim is:

1. A process for preparing shaped articles of a uranium silicide selected from the group consisting of $U_3Si_2$, USi, $USi_2$ and $USi_3$, which comprises introducing into a mould an intimate mixture of particles of uranium and silicon in substantially stoichiometric proportions corresponding to the uranium silicide selected for manufacture, compacting the mixture, heating the mixture in a first stage under vacuum in the mould to a temperature between 450° C. and 675° C., in order to cause reaction of the silicon and the uranium, and subjecting the coherent porous product so obtained to heating in a second stage under vacuum at a temperature higher than that of the first heating stage and lower than the melting point of the selected uranium silicide in order to complete the reaction between the silicon and the uranium and obtain a coherent non-porous article.

2. A process according to claim 1, in which the intimate mixture of particles of uranium and silicon is compacted within the mould by vibration.

3. A process according to claim 1, in which the $U_3Si_2$ mixture is compacted to an apparent density of approximately 5.8.

4. A process according to claim 1, in which the USi mixture is compacted to an apparent density of approximately 5.6.

5. A process according to claim 1, in which the $USi_2$ mixture is compacted to an apparent density of approximately 4.4.

6. A process according to claim 1, in which the $USi_3$ mixture is compacted to an apparent density of approximately 3.7.

7. A process according to claim 12, in which the second heating stage is carried out by maintaining the temperature between 1400° and 1500° C., whereby a coherent non-porous article of a density equal to at least 90% of the theoretical density is produced.

8. A process according to claim 1, in which the second heating stage is carried out by means of the Joule effect, the product obtained after the first heating stage being a conductor of electricity.

9. A process according to claim 1, in which the second heating stage is carried out by electrical induction, the product obtained after the first stage heating being a conductor of electricity.

10. A process according to claim 9, in which the product and the induction element undergo relative displacement, whereby the second heating stage is effected on successive zones of the product.

11. In a process for preparing a shaped article of uranium silicide selected from the group consisting of $U_3Si_2$, USi, $USi_2$ and $USi_3$, the steps of introducing into a mould an intimate mixture of particles of uranium and silicon in proportion corresponding to the selected uranium silicide, compacting the mixture, heating the mixture under vacuum at a temperature of from 450° to 675° C. for at least one hour, then subjecting the mixture to heating under vacuum at a temperature of from about 1400° to 1500° C. until the article has the desired bulk density, cooling the article and then withdrawing the article from the mould.

12. In a process for preparing a shaped article of a uranium silicide selected from the group consisting of $U_3Si_2$, USi, $USi_2$ and $USi_3$, the steps of introducing into a mould an intimate mixture of particles of uranium and silicon substantially in the stoichiometric proportions corresponding to the selected silicide, compacting the mixture, heating the mixture under vacuum at a temperature of from 625° C. to 675° C. for at least one hour and then subjecting the mixture to heating under vacuum at a temperature higher than the temperature range for the first heating step and lower than the melting point of the mixture until the article has the desired bulk density.

References Cited in the file of this patent

UNITED STATES PATENTS

| | | |
|---|---|---|
| 2,534,676 | Newton | Dec. 19, 1950 |
| 2,569,225 | Carter et al. | Sept. 25, 1951 |
| 2,982,619 | Long | May 2, 1961 |

OTHER REFERENCES

Reactor Core Materials, vol. 1, No. 3, page 18, August 1958.

AEC Document ORO-212, pp. 13-16, Sept. 15, 1959.

Katz and Seaborg: "Chemistry of the Actinide Elements," page 148 (1957).

Second U.N. International Conf. on Peaceful Uses of Atomic Energy, vol. 6, Sergeyev et al., page 27, Dabvisson et al., pages 551-560, Murray, pages 543, 544, 545 (Sept. 13, 1958).

AEC Document BMI 1223, pp. 1, 2, 5-7, 14, 22-28, 33, 34 (Sept. 9, 1957).

Nuclear Science Abstracts: vol. 14, Item 1446, Jan. 31, 1960 (which reports ORO-213, dated Oct. 6, 1959), Item 9757, May 31, 1960 (which reports ORO-254, dated Jan. 8, 1960).